May 24, 1955 T. O. KOSATKA 2,709,098
FLUID SEAL
Filed Aug. 31, 1951
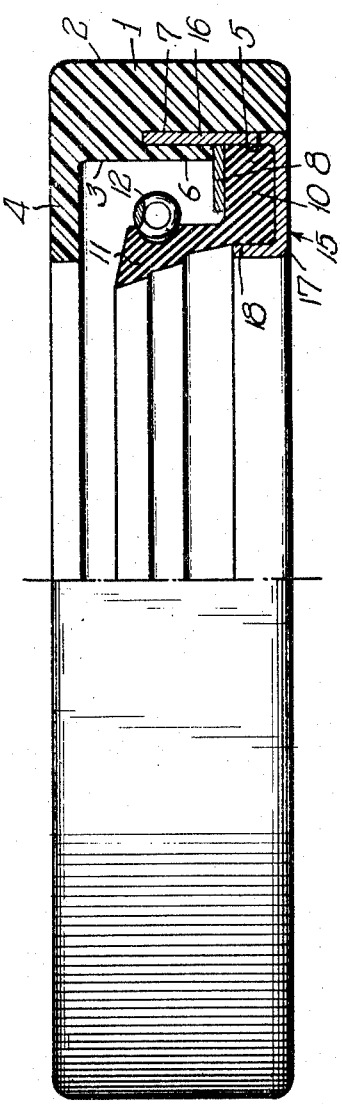
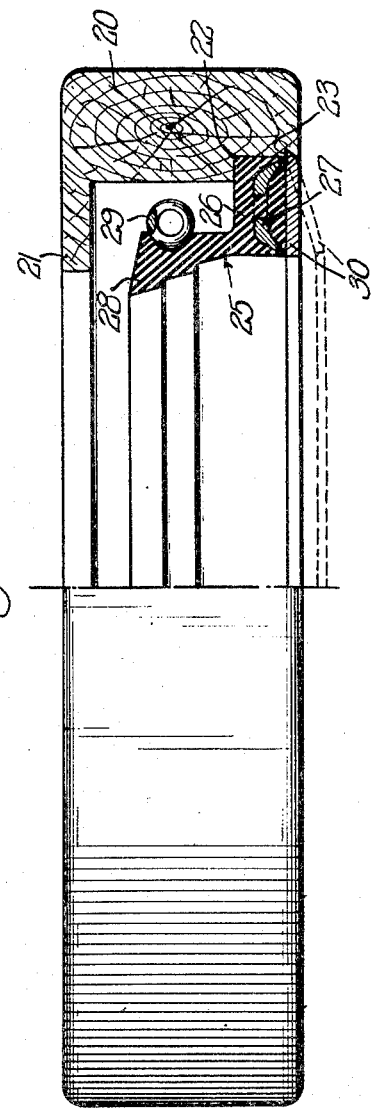
INVENTOR.
Thomas O Kosatka,
BY George T Haight &
George H Simmons
attys.

United States Patent Office 2,709,098
Patented May 24, 1955

2,709,098

FLUID SEAL

Thomas O. Kosatka, Chicago, Ill., assignor to Victor Manufacturing & Gasket Co., Chicago, Ill., a corporation of Illinois Application August 31, 1951, Serial No. 244,644

3 Claims. (Cl. 288—3)

This invention relates to seals for sealing the space between a rotary shaft and a housing through which the shaft projects, and has for its principal object the provision of a new and improved seal of this kind.

It is a main object of the invention to provide a fluid seal which utilizes a minimum quantity of metal.

Another object of the invention is to provide a fluid seal having a non-metallic shell which can be made accurately to size by molding.

Another object of the invention is to provide a non-metallic shell for fluid seals, which can be manufactured at low cost without sacrificing quality.

Further objects of the invention not specifically mentioned here will be apparent from the detailed description and claims which follow, reference being had to the accompanying drawings in which a preferred embodiment of the invention is shown by way of example and in which:

Fig. 1 is a quarter section view of a fluid seal embodying the teachings of the invention; and Fig. 2 is a quarter section view of a modified form of seal.

Self-contained fluid seals for sealing the space between a rotating shaft and a housing through which the shaft projects consist of an outer shell usually composed of metal and within which is a sealing element consisting of a rubberlike material which is impervious to the fluid that is to be sealed. In certain instances the sealing element is composed of a resilient material such as leather.

The metal shells of seals of this kind, while entirely satisfactory, are relatively expensive to make because of the numerous steps or operations required to form, de-grease, plate, and otherwise prepare the shell for use. There are numerous instances in industry where a cheaper seal would be advantageous if such a seal can be provided without sacrifice of quality.

The present invention provides a fluid seal having the usual rubberlike sealing elements encased in a non-metallic shell molded from a thermosetting plastic, such as for example a phenol condensation product, and incorporating a fibrous material as a filler, thereby enabling the shell to withstand shocks placed upon it in the normal use of the sealing device. The seal of the present invention can thus be made at a lower cost and in addition employs a minimum of metal which in times of metal shortages is a further distinct advantage.

The present invention also contemplates forming the shell of a fluid seal out of wood, such as for example hard maple which may be treated by impregnation to render it impervious to the fluids with which it will come in contact. Such a seal is likewise inexpensive to make and employs a bare minimum of strategic materials that become short in times of emergency.

Referring now to the drawings, Fig. 1 shows in quarter section a preferred embodiment of the invention. The shell consists of a hollow cylindrical member 1, the outer cylindrical surface 2 of which is of such diameter as to provide a press fit into the opening in the housing through which the shaft projects. The inner surface 3 of this shell is of such diameter as to provide proper spacing between the shaft and shell. The radial thickness of the shell 1 may be varied over a wide range to accommodate the sealing device to various differences between shaft diameter and housing opening diameter as encountered in the tray.

Projecting radially inwardly from one end of the cylindrical shell 1 is an integral flange 4 which terminates on a cylinder of diameter somewhat greater than the diameter of the shaft so as to provide ample clearance between the rotating shaft and the stationary shell. It will be observed that the thickness of the flange axially of the sealing device is much less than the radial thickness of the shell.

Opening into the inner surface 3 of the shell 1 is a recess 5 which extends from the end of the shell opposite the flange 4 somewhat more than half of the axial length of the shell. Projecting into this recess 5 is a cylindrical flange 6 which divides the recess into a main portion opening into the end of the shell and a cylindrical extension 7 thereof.

A metal washer 8 is fitted in the shell 1 and abuts against the end of the cylindrical flange 6, with the outer edge of the washer coinciding with the outer edge of the cylindrical flange.

Registered with the main portion of the recess 5 is an elastomer sealing element comprising an annular base 10 the outer diameter of which is greater than the diameter of the inner wall 3 of the shell, but less than the outer diameter of the recess 5. A sealing element, indicated generally at 11, projects from the base inwardly towards the axis of the shell and towards the flange 4, terminating in a shaft engaging lip that maintains seal with the shaft. A garter spring 12 is registered in a groove in the outer surface of the sealing lip and tensioned to urge that lip inwardly into seal-forming engagement with the shaft.

A clamping ring, indicated generally at 15, is employed to secure the sealing element in the shell, this ring consisting of an outer cylindrical portion 16 which is of such dimension as to form a press fit with the outer surface of the groove 5 and extension 7 thereof. An annular portion 17 of the clamping ring 15 engages the base 10 and compresses the same axially of the shaft and against the washer 8. An inner cylindrical portion 18 of the clamping ring 15 engages the inner edge of the base and causes compression of the base to expand the same outwardly into seal-forming engagement with the shell. The compressing of the base also secures the elastomer sealing element against rotation in the shell.

Preferably the shell 2 is composed of a thermosetting synthetic resin having a fibrous filler which renders the shell capable of withstanding shocks and vibration. The shell can be molded accurately to size and when composed of a resin, such as a phenol condensation product, requires no operations after molding to finish the shell for use. The cost of the shell is therefore low, and it is capable of withstanding temperatures higher than are encountered by seals of this kind. The material has a low coefficient of thermal expansion and the shell is therefore capable of rendering satisfactory service over a long period of time. If desired, the shell may be formed from a hard wood, such as maple, which possesses similar characteristics.

In the embodiment of the invention shown in Fig. 2, the shell 20 has inner and outer cylindrical walls as before, and is equipped with a radially inwardly projecting flange 21 that is integral with the main body of the shell. A simple recess 22 opens into the end of the shell opposite the flange. Adjacent the end of the recess is a generally V-shaped extension 23 which is of slightly larger diameter than the main portion of the recess.

In this embodiment of the invention the elastomer sealing element, indicated generally at 25, has a base portion 26 in which is embedded a flanged metallic washer 27. The sealing lip 28 and garter spring 29 are identical with those shown in Fig. 1.

The base portion 26 of the sealing element fits in the recess 22 and against the shoulder in the shell 20 defining the inner end of this recess. This base is clamped between this shoulder and a metallic washer 30 which is normally dished in the manner shown in dotted lines and is sprung into planar configuration to clamp the base of the sealing element in the shell to form a seal therewith and to secure the sealing elements against rotation with respect to the shell.

The shell shown in Fig. 2 may be composed either of a hard wood or a thermosetting synthetic resin with a fibrous filler and is capable of being manufactured at low cost without sacrificing quality.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have patented by Letters Patent is pointed out in the appended claims.

What is claimed is:

1. In a fluid seal, a hollow cylindrical shell composed of a unitary mass of non-metallic material; an integral flange extending radially inwardly from one end of said shell, said shell having a cylindrical recess in its inner wall opening into the end thereof away from said flange; a cylindrical flange aligned with the inner surface of said shell and extending into said recess to divide the same into a main portion and an extension thereof; a metallic washer abutted against the end of said cylindrical flange and projecting radially inwardly therefrom; an elastomer annulus disposed in the main portion of said recess and extending radially inwardly therefrom in engagement with said washer; a metallic clamping ring comprising an outer cylindrical portion disposed in said recess extension, an annular portion disposed against the free face of said elastomer annulus, and an inner cylindrical portion disposed against the inner edge of said elastomer annulus, said clamping ring compressing said elastomer annulus to form a seal and to hold the annulus against rotation in the shell; a sealing element extending from said annulus towards said integral flange and inwardly towards the axis of said shell; and a garter spring encircling said sealing element.

2. A fluid seal comprising: a hollow cylindrical unitary shell composed of a homogeneous non-metallic material; a relatively thin integral flange projecting radially inwardly from one end of said shell, said shell having a cylindrical recess in the inner surface extending axially to the other end thereof, said recess having an annular extension projecting towards said flange and disposed radially outwardly from said inner surface; a metallic annulus disposed against the wall separating said extension from said inner surface and projecting radially inwardly therefrom; an elastomer sealing element comprising a cylindrical base registered with said annulus and a frusto-conical sealing lip projecting from one end of said base adjacent said annulus towards said flange and inwardly towards the axis of said shell; a garter spring encircling said sealing lip; and a J-shaped metallic ring disposed in said extension of said recess and engaging the other end of said base opposite said annulus and the inner surface of the base to fix the sealing element against rotation in the shell and to form a seal between the element and shell.

3. A fluid seal comprising: a hollow cylindrical unitary shell; an integral radial flange projecting inwardly from one end of said shell, said shell having a cylindrical recess in the inner surface extending axially to the unflanged end of the shell; an integral cylindrical flange in said shell one face of which coinsides with the inner surface thereof defining a cylindrical extension of said recess, said cylindrical flange terminating in an end surface that is spaced from and parallel to the unflanged end of the shell; a metallic annulus registered with said cylindrical flange and projecting inwardly therefrom; an elastomer sealing element comprising an annular base, registered in said recess and disposed against said metallic annulus, and a frusto-conical sealing lip projecting from the inner end of said base towards the radial flange on said shell; a garter spring encircling said sealing lip; and a second metallic ring of generally J-section frictionally engaging the walls of said recess and extension thereof and said elastomer base to secure the sealing element against rotation in the shell and to form a seal between the element and shell.

References Cited in the file of this patent

UNITED STATES PATENTS

| 97,585 | Allmand | Dec. 7, 1869 |
| 2,483,988 | Victor | Oct. 4, 1949 |
| 2,493,255 | Lillis | Jan. 3, 1950 |
| 2,542,234 | Chambers | Feb. 20, 1951 |
| 2,598,094 | Augereau | May 27, 1952 |

FOREIGN PATENTS

| 9,214 | Great Britain | May 2, 1899 |
| 544,904 | Great Britain | May 1, 1942 |
| 549,158 | Great Britain | Nov. 9, 1942 |
| 562,922 | Great Britain | July 21, 1944 |